United States Patent
Zhang et al.

(10) Patent No.: US 9,397,786 B2
(45) Date of Patent: Jul. 19, 2016

(54) SYSTEM AND METHOD INCLUDING MODIFIED BIT-INTERLEAVED CODED MODULATION

(75) Inventors: Hongbin Zhang, Marlboro, NJ (US); Hussam G. Batshon, Eatontown, NJ (US)

(73) Assignee: TYCO ELECTRONICS SUBSEA COMMUNICATIONS LLC, Morristown, NJ (US)

( * ) Notice: Subject to any disclaimer, the term of this patent is extended or adjusted under 35 U.S.C. 154(b) by 0 days.

(21) Appl. No.: 13/569,628

(22) Filed: Aug. 8, 2012

(65) Prior Publication Data

US 2013/0216221 A1 Aug. 22, 2013

Related U.S. Application Data

(60) Provisional application No. 61/600,989, filed on Feb. 20, 2012.

(51) Int. Cl.
| | |
|---|---|
| H04J 14/02 | (2006.01) |
| H04B 10/00 | (2013.01) |
| H04B 10/04 | (2006.01) |
| H04B 10/12 | (2006.01) |
| H04L 1/00 | (2006.01) |

(52) U.S. Cl.
CPC ............ *H04L 1/0065* (2013.01); *H04L 1/0057* (2013.01); *H04L 1/0063* (2013.01); *H04L 1/0071* (2013.01)

(58) Field of Classification Search
USPC .................. 398/83, 122, 123, 130, 183, 192
See application file for complete search history.

(56) References Cited

U.S. PATENT DOCUMENTS

| | | | |
|---|---|---|---|
| 6,259,743 B1 | 7/2001 | Garth | |
| 6,622,277 B1 * | 9/2003 | Ramanujam et al. | 714/755 |
| 6,904,087 B2 | 6/2005 | Li | |
| 7,116,724 B2 * | 10/2006 | You | 375/267 |
| 7,620,881 B2 * | 11/2009 | Nieto | 714/794 |
| 8,255,763 B1 | 8/2012 | Yang et al. | |
| 2002/0166091 A1 * | 11/2002 | Kidorf et al. | 714/752 |
| 2004/0010747 A1 * | 1/2004 | Hewitt et al. | 714/793 |
| 2005/0105649 A1 * | 5/2005 | Takizawa et al. | 375/324 |
| 2005/0166132 A1 * | 7/2005 | Shen et al. | 714/801 |
| 2005/0278607 A1 * | 12/2005 | Garodnick | 714/774 |
| 2006/0031737 A1 * | 2/2006 | Chugg et al. | 714/755 |
| 2007/0118787 A1 | 5/2007 | Schmidt | |

(Continued)

FOREIGN PATENT DOCUMENTS

EP 1835625 A1 9/2007

OTHER PUBLICATIONS

Jianzhong Guo et al: "Performance Analysis of PA Coded Pulse-Position Modulation for Space Optical Communications", Information Engineering and Computer Science (ICIECS), 2010 2nd International Conference on IEEE, Piscataway, NJ, USA, Dec. 25, 2010, pp. 1-3, XP031842377, ISBN: 978-1-4244-7939-9.

(Continued)

*Primary Examiner* — David Payne
*Assistant Examiner* — Pranesh Barua (57) ABSTRACT

A system and method with a modified bit-interleaved coded modulation with iterative decoding (BICM-ID). Coded and interleaved bits are combined and coded with a second FEC code that is then mapped to a modulation format. The second FEC code may be a single parity check (SPC) and the scheme may be referred to as a SPC-BICM-ID scheme.

18 Claims, 7 Drawing Sheets

(56) References Cited

U.S. PATENT DOCUMENTS

| | | | | |
|---|---|---|---|---|
| 2007/0223602 | A1* | 9/2007 | Yu et al. | 375/260 |
| 2008/0225965 | A1* | 9/2008 | Pi et al. | 375/260 |
| 2008/0273614 | A1* | 11/2008 | Heegard et al. | 375/260 |
| 2009/0150746 | A1* | 6/2009 | Chaichanavong et al. | 714/752 |
| 2009/0232256 | A1* | 9/2009 | Gu | 375/341 |
| 2010/0146363 | A1* | 6/2010 | Birru et al. | 714/752 |
| 2010/0169738 | A1* | 7/2010 | Wu et al. | 714/752 |
| 2012/0072802 | A1* | 3/2012 | Chinnici et al. | 714/758 |
| 2012/0079341 | A1* | 3/2012 | Wajcer et al. | 714/752 |
| 2012/0242518 | A1* | 9/2012 | Martin | 341/81 |
| 2013/0002962 | A1* | 1/2013 | Limberg | 348/724 |

OTHER PUBLICATIONS

Cai Y et al: "On the Bit-Error Rate of Product Accumulate Codes in Optical Fiber Communications", Journal of Lightwave Technology, IEEE Service Center, New York, NY, US, vol. 22, No. 2. Feb. 1, 2004, pp. 640-646, XP011109885, ISSN: 0733-8724, DOI:10.1109/JLT. 2003.821766.

Siegel P H et al: "Serial Concatenated TCM With an Inner Accumulate Code-Part II: Density-Evolution Analysis", IEEE Transactions on Communications, IEEE Service Center, Piscataway, NJ, USA, vol. 53, No. 2, Feb. 1, 2005, pp. 252-262, XP011127707, ISSN: 0090-6778, DOI: 10.1109/TCOMM.2004.841986.

Chung-Li Wang et al: "Low-density parity-check accumulate codes", Information Theory and Its Applications (ISITA), 2010 International Symposium on, IEEE, Piscataway, NJ, USA, Oct. 17, 2010, pp. 7-12, XP031811755, ISBN: 978-1-4244-6016-8.

International Search Report issued in corresponding PCT Patent Application No. PCT/US2013/024014 dated Apr. 12, 2013.

Zhang et al; "Single Parity Check Bit Interleaved Coded Modulation with Iterative Decoding"; 8 pages.

Zhang et al; "Square Modulus Algorithm for Blind Equalization and Carrier Phase Recovery in a 16-QAM Optical Coherent System"; 6 pages.

Alex Alvarado; "On Bit-Interleaved Coded Modulation with QAM Constellations"; Chalmers; Department of Signals and Systems; Communication Systems Group, Chalmers University of Technology; Goteborg, Sweden, May 2008, 52 pages.

Charan Langton, Editor; "Signal Processing & Simulation Newsletters"; Jul. 1999; 27 pages; http://www.complextoreal.com/convo. htm printed Feb. 9, 2012.

Chip Fleming; "A Tutorial on Convolutional Coding with Viterbi Decoding"; Spectrum Applications; Updated Jun. 21, 2011; printed at http://pw1.netcom.com/~chip.f/viterbi/tutorial.html on Feb. 9, 2012; 5 pages.

"Gray Code"; Wikipedia; printed Feb. 13, 2012; 16 pages.

"Convolutional Code"; Wikipedia; printed Feb. 9, 2012; 7 pages.

Krishna Sankar; "Binary to Gray Code for 16QAM"; Jun. 1, 2008; printed at http://www.dsplog.com/2008/06/01/binary-to-gray-code-for-16qam/ on Feb. 13, 2012.

Zhang et al; "16QAM Transmission with 5.2 bits/s/Hz Spectral Efficiency Over Transoceanic Distance"; Optics Express; May 21, 2012; vol. 20, No. 11.

Muhammad "Coding and Modulation for Spectral Efficient Transmission," Institut fur Nachrichlenubertragung der Universitat Stuttgart (2010) 156 pages.

* cited by examiner

SYSTEM AND METHOD INCLUDING MODIFIED BIT-INTERLEAVED CODED MODULATION

CROSS-REFERENCE TO RELATED APPLICATIONS

This application claims the benefit of the filing date of U.S. Provisional Application Ser. No. 61/600,989 filed Feb. 20, 2012, the teachings of which are hereby incorporated herein by reference.

TECHNICAL FIELD

The present application relates to the optical transmission of information and, more particularly, to a system and method including a modified bit-interleaved coded modulation.

BACKGROUND

In wavelength division multiplexed (WDM) optical communication systems, a number of different optical carrier wavelengths are separately modulated with data to produce modulated optical signals. The modulated optical signals are combined into an aggregate signal and transmitted over an optical transmission path to a receiver. The receiver detects and demodulates the data.

One type of modulation that may be used in optical communication systems is phase shift keying (PSK). According to different variations of PSK, data is transmitted by modulating the phase of an optical wavelength such that the phase or phase transition of the optical wavelength represents symbols encoding one or more bits. In a binary phase-shift keying (BPSK) modulation scheme, for example, two phases may be used to represent 1 bit per symbol. In a quadrature phase-shift keying (QPSK) modulation scheme, four phases may be used to encode 2 bits per symbol. Other phase shift keying formats include differential phase shift keying (DPSK) formats and variations of PSK and DPSK formats, such as return-to-zero DPSK (RZ-DPSK) and phase division multiplexed QPSK (PDM-QPSK).

A modulation format, such as QPSK wherein multiple data bits are be encoded on a single transmitted symbol may be generally referred to as a multi-level modulation format. Multi-level modulation techniques have been used, for example, to allow increased transmission rates and decreased channel spacing, thereby increasing the spectral efficiency (SE) of each channel in a WDM system. One spectrally efficient multi-level modulation format is quadrature amplitude modulation (QAM). In a QAM signal, information is modulated using a combination of phase shift keying and amplitude shift keying, for example, to encode multiple bits per symbol. A 16-QAM modulation format may be used, for example, to encode 4 bits per symbol. Certain PSK modulation schemes (e.g., BPSK and QPSK) may be referred to as a level of QAM (e.g., 2 QAM and 4 QAM respectively).

One problem associated with optical communication systems is maintaining the integrity of the data being communicated, particularly when optical signals are transmitted over long distances in long-haul communication systems. Accumulated noise contributed by many different sources in a transmission path may cause degradation of the signals and may cause difficulty in differentiating between the binary digits (i.e., the ones and zeros) in a data stream.

Forward Error Correction (FEC) is a technique used to help compensate for this degradation. FEC is essentially the incorporation of a suitable code into a data stream at the transmitter. The transmitter receives a data stream and encodes the data stream using an FEC encoder that introduces some redundancy in the binary information sequence of the data stream. The receiver receives the encoded data and runs it through an FEC decoder to detect and correct errors.

Gray mapping has also been applied to achieve improvements in detection. Gray mapping is a known process wherein a non-weighted code is assigned to each of a contiguous set of bits such that adjacent code words differ by one symbol, i.e. they have a Hamming distance of 1. For example, in a 16 QAM system where data is transmitted in symbols representing 4-bits the constellation diagram of the signal is arranged with Gray mapping such that Gray coded patterns of 4-bits conveyed by adjacent constellation points differ by only one bit. Combining Gray mapping with FEC can facilitate correction of transmission errors that cause a constellation point in the signal constellation diagram to deviate into the area of an adjacent point.

One approach to combining data modulation with FEC coding is known as bit-interleaved coded-modulation (BICM). In a BICM scheme FEC coding is applied to a data stream and the FEC coded data stream is then bit-interleaved (i.e. the order of the bits is permuted). The coded and interleaved data stream is then modulated according to a selected data modulation with, or without, Gray mapping. The performance of BICM can be further increased in some cases by exchanging information between the de-mapper and the decoder and performing iterative decoding (ID). BICM schemes with ID decoding are known as BICM-ID schemes.

It has been found, however, that the performance of BICM with Gray mapping may be limited. BICM-ID without Gray mapping can actually outperform BICM with Gray mapping for some FEC codes and may achieve vanishing error probability with iterative decoding. For other FEC codes, however, BICM-ID without Gray mapping may still outperform BICM with Gray mapping, but performance improvements diminish with iterative decoding so that essentially error-free decoding is not achieved.

BRIEF DESCRIPTION OF THE DRAWINGS

Reference should be made to the following detailed description which should be read in conjunction with the following figures, wherein like numerals represent like parts.

DETAILED DESCRIPTION

In general, a system consistent with the present disclosure implements a modified BICM-ID scheme wherein coded and interleaved bits are combined and coded with a second FEC code that is then mapped to a modulation format. In one particularly advantageous embodiment the second FEC code may be a single parity check (SPC) and the scheme may be referred to as a SPC-BICM-ID scheme. In such an embodiment, the incoming data stream may be demultiplexed into a plurality of data streams with each of the data streams being coded with a low density parity check (LDPC) FEC code and then bit-interleaved. The bit-interleaved and coded LDPC data may then be combined and coded with the single parity check (SPC) and Gray mapped to one or more QAM symbols. Iterative decoding may be performed at the receiver to achieve bit error rate (BER) performance that improves with successive iterations.

As used herein an "FEC code" refers to a scheme whereby one or more bits (the overhead associated with the code) are added to a data stream to assist in detection or correction of data errors. As used herein a "Gray map" or "Gray mapping" refers to the known Gray mapping scheme whereby a code is assigned to each of a contiguous set of bits such that adjacent code words differ by one symbol and does not involve adding additional bits to a data stream (i.e. Gray mapping has no overhead). The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals.

Figure 1:
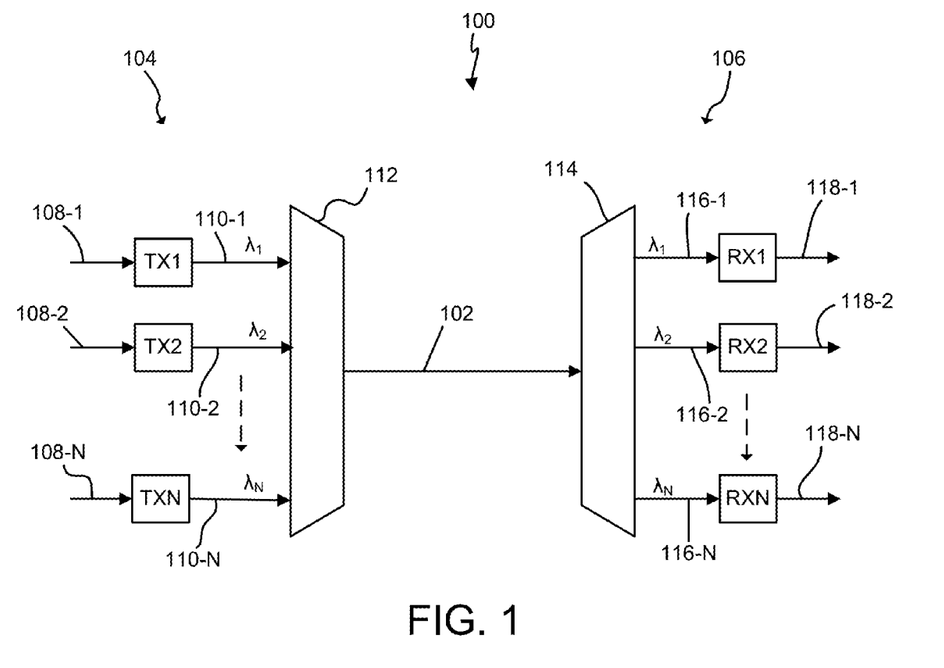
FIG. 1 is a block diagram of one exemplary embodiment of a system consistent with the present disclosure.

FIG. 1 is a simplified block diagram of one exemplary embodiment of a WDM transmission system 100 consistent with the present disclosure. The transmission system serves to transmit a plurality of optical channels over an optical information path 102 from a transmitting terminal 104 to one or more remotely located receiving terminals 106. The exemplary system 100 may be a long-haul submarine system configured for transmitting the channels from a transmitter to a receiver at a distance of 5,000 km, or more. Although exemplary embodiments are described in the context of an optical system and are useful in connection with a long-haul WDM optical system, the broad concepts discussed herein may be implemented in other communication systems transmitting and receiving other types of signals.

Those skilled in the art will recognize that the system 100 has been depicted as a highly simplified point-to-point system for ease of explanation. For example, the transmitting terminal 104 and receiving terminal 106 may, of course, both be configured as transceivers, whereby each may be configured to perform both transmitting and receiving functions. For ease of explanation, however, the terminals are depicted and described herein with respect to only a transmitting or receiving function. It is to be understood that a system and method consistent with the disclosure may be incorporated into a wide variety of network components and configurations. The illustrated exemplary embodiments herein are provided only by way of explanation, not of limitation.

In the illustrated exemplary embodiment, each of a plurality of transmitters TX1, TX2 ... TXN receives a data signal on an associated input port 108-1, 108-2 ... 108-N, and transmits the data signal on associated wavelength $\lambda_1, \lambda_2 \ldots \lambda_N$. One or more of the transmitters TX1, TX2 ... TXN may be configured to modulate data on the associated wavelength with using a modified BICM-ID scheme consistent with the present disclosure. The transmitters, of course, are shown in highly simplified form for ease of explanation. Those skilled in the art will recognize that each transmitter may include electrical and optical components configured for transmitting the data signal at its associated wavelength with a desired amplitude and modulation.

The transmitted wavelengths or channels are respectively carried on a plurality of paths 110-1, 110-2 ... 110-N. The data channels are combined into an aggregate signal on optical path 102 by a multiplexer or combiner 112. The optical information path 102 may include optical fiber waveguides, optical amplifiers, optical filters, dispersion compensating modules, and other active and passive components.

The aggregate signal may be received at one or more remote receiving terminals 106. A demultiplexer 114 separates the transmitted channels at wavelengths $\lambda_1, \lambda_2 \ldots \lambda_N$ onto associated paths 116-1, 116-2 ... 116-N coupled to associated receivers RX1, RX2 ... RXN. One or more of the receivers RX1, RX2 ... RXN may be configured to demodulate the transmitted signal using iterative decoding associated with a modified BICM-ID scheme consistent with the present disclosure and may provide an associated output data signal on an associated output path 118-1, 118-2, 118-3, 118-N.

Figure 2:
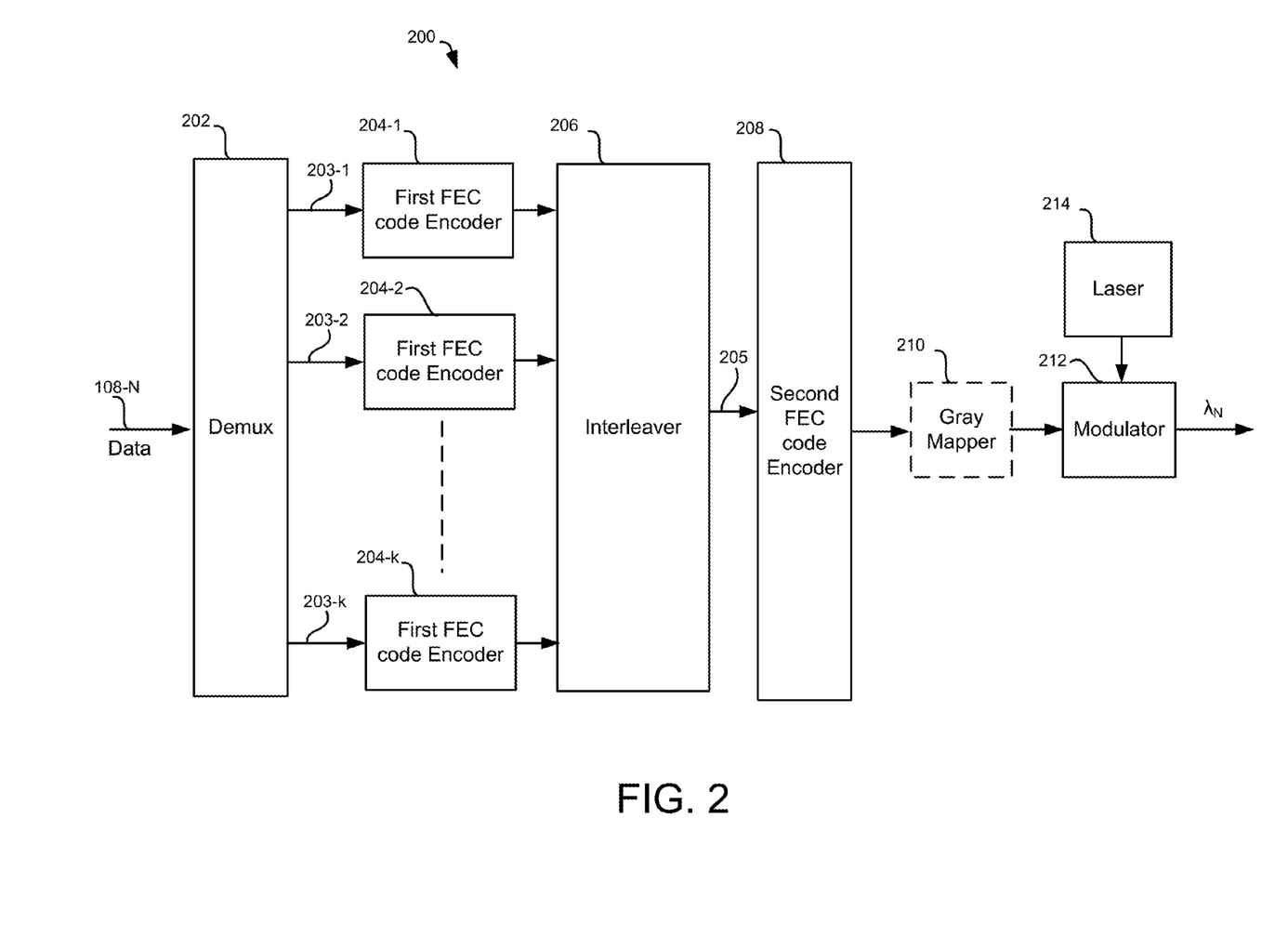
FIG. 2 is a block diagram of one exemplary embodiment of a transmitter consistent with the present disclosure.

FIG. 2 is a simplified block diagram of one exemplary transmitter 200 consistent with the present disclosure. The illustrated exemplary embodiment 200 includes a demultiplexer 202, a plurality of first FEC code encoders 204-1, 204-2 ... 204-k, an interleaver 206, a second FEC encoder 208, a Gray mapper 210, and a modulator 212 for modulating the output of a continuous-wave laser 214 for providing a coded and modulated output on a carrier wavelength $\lambda_N$.

The demultiplexer 202 may take a known configuration for receiving a serial input data stream 118-N and demultiplexing the input data stream 118-N into k separate parallel data streams, i.e. every $k^{th}$ bit is separated by the demultiplexer 202 onto the $k^{th}$ data path 203-1, 203-2 ... 203-k. Each of the k data streams are coupled to an associated one of the first FEC code encoders 204-1, 204-2 ... 204-k. The first FEC code encoders 204-1, 204-2 ... 204-k may each be configured to encode the data stream received thereby with an associated first FEC code.

Numerous FEC codes are known, each with different properties related to how the codes are generated and consequently how they perform. Examples of known error correcting codes include the linear and cyclic Hamming codes, the cyclic Bose-Chaudhuri-Hocquenghem (BCH) codes, the convolutional (Viterbi) codes, the cyclic Golay and Fire codes, Turbo convolutional and product codes (TCC, TPC), and low density parity check codes (LDPC). Hardware and software configurations for implementing various error correcting codes in the first FEC code encoders 204-1, 204-2 ... 204-k and corresponding decoders 408-1, 408-2 ... 408-k (FIG. 4) are known to those of ordinary skill in the art.

The encoded output of each of the first FEC code encoders 204-1, 204-2 ... 204-k is coupled to the interleaver 206. A variety of interleaver configurations are known. In the illustrated embodiment, the interleaver 206 receives k output codewords from the first FEC encoders 204-1, 204-2 ... 204-k and provides a serial output of k interleaved bits to the second FEC code encoder 208. Although in the illustrated embodiment, the interleaver 206 interleaves the k output bits of the first FEC encoders 204-1, 204-2 ... 204-k, those of ordinary skill in the art will recognize that other interleaving configurations may be implemented in a system consistent with the present disclosure. For example, in another embodiment the interleaver 206 may be configured to interleave the outputs of the first FEC encoders 204-1, 204-2 ... 204-k individually and then provide a serial output of k bits a bit from each of the interleaved outputs of the first FEC encoders 204-1, 204-2 ... 204-k.

The second FEC code encoder 208 receives the encoded and interleaved output of the interleaver 206 and encodes each k bits with a second FEC code. The second FEC code may be any known FEC code. One FEC code that is particularly useful in a modified BICM-ID scheme consistent with the present disclosure is a known single parity check (SPC) code. A SPC code adds a single parity bit to each k data bits. The parity bit indicates the parity (odd or even number of ones in the bit stream) of the k data bits associated therewith. A modified BICM-ID scheme consistent with the present disclosure wherein the second FEC code is an SPC code may be referred to as a SPC-BICM-ID scheme.

A SPC code has a code rate as k/(k+1). For example, when k=7, the SPC code has 14% overhead. In order to maintain the same total overhead as a system using BICM or BICM-ID only with an overhead of 23%, the overhead of the first FEC code for an SPC-BICM-ID scheme consistent with the present disclosure cannot exceed 8.95%. However, this decrease in the overhead of the first FEC code does not negatively impact performance. The performance of a code can be characterized by the FEC threshold, which may be defined as the Q value at the input of the FEC decoder such that the bit error ratio of the FEC decoder output is less a predefined value, e.g. $10^{-15}$. A system consistent with the present disclosure can produce an FEC threshold, e.g. after iteration, that is lower than the FEC threshold achieved by a system without a second FEC code and with a higher overhead in the first FEC code.

The output of the second FEC code encoder 208 may be coupled to a known Gray mapper 210. The Gray mapper 210 may be configured to code each k+1 of the data bits (k data bits, along with the associated parity check bit), using a Gray map. The Gray mapped k+1 bits may be modulated onto an optical carrier wavelength $\lambda_N$ of a continuous-wave laser 214 using a known modulator 212. The encoded, mapped and modulated output of the modulator may be coupled to the multiplexer 112 (FIG. 1) in a WDM system.

Figure 3:
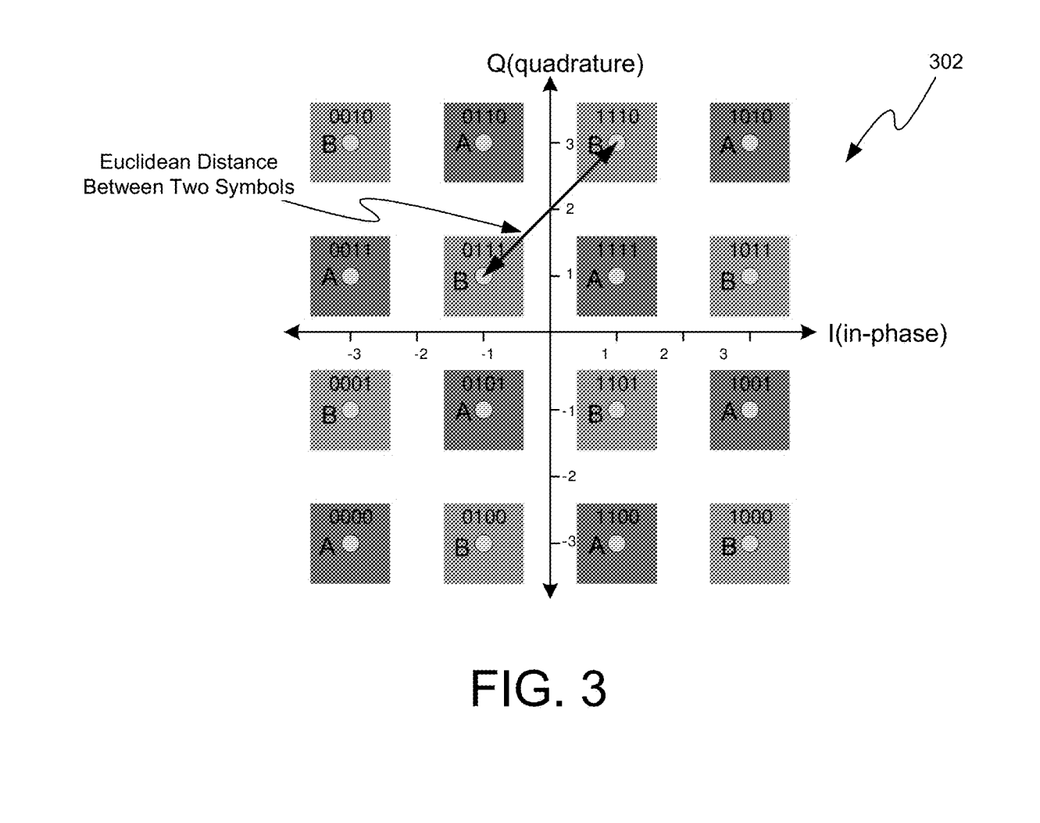
FIG. 3 is a constellation diagram of one exemplary embodiment 16 QAM signal with Gray mapping consistent with the present disclosure.

The modulator 212 may modulate the output of the Gray mapper 210 on to the carrier wavelength $\lambda_N$ using any known modulation method. In one embodiment consistent with the present disclosure, the modulator may modulate every k+1 of the Gray mapped bits into one or more QAM symbols. For example, every k+1 of the Gray mapped bits may be modulated into either one $2^{k+1}$ QAM symbol or two $2^{(k+1)/2}$ QAM symbols. FIG. 3, for example illustrates a constellation diagram 302 of a 16 QAM signal with a Gray mapping of each 4-bits from the second FEC encoder 208 to an associated constellation point.

In a WDM system 100, the optical output of the modulator 212 may be coupled to the multiplexer 112 and multiplexed with optical outputs of other transmitters into an aggregate signal for transmission over the optical information channel 102. The demultiplexer 114 at the receiving terminal may demultiplex the aggregate signal and the demultiplexed optical signals maybe coupled to associated receivers. The receivers are configured for demodulating and decoding the optical signals to reproduce the associated data streams 118-N.

Figure 4:
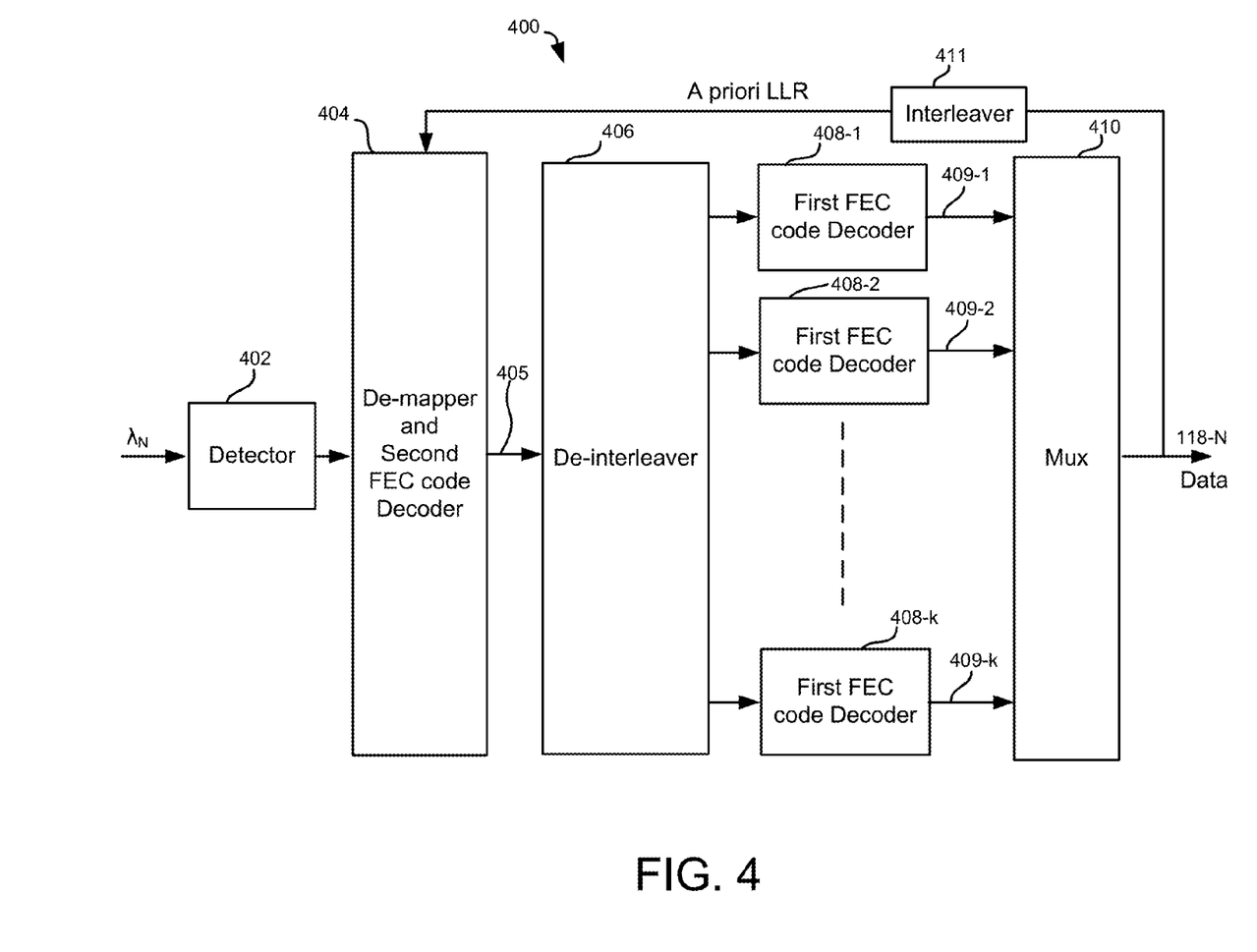
FIG. 4 is a block diagram of one exemplary embodiment of a receiver consistent with the present disclosure.

FIG. 4 is a simplified block diagram of one exemplary receiver 400 consistent with the present disclosure. The illustrated exemplary embodiment 400 includes a detector 402, a de-mapper and second FEC decoder 404, a de-interleaver 406, a plurality of first FEC code decoders 408-1, 408-2 . . . 408-k, a multiplexer 410, and an interleaver 411.

The detector 402 may be configured to receive the optical signal modulated on the carrier wavelength $\lambda_N$ and to convert the optical signal into a digital electrical signal. In one embodiment, for example, the detector 402 may provide in a known coherent receiver configuration, e.g. a polarization diversity coherent receiver, and a digital signal processing (DSP) circuit. The DSP circuit may process the output of the coherent receiver to provide a digital output signal to the de-mapper and second FEC decoder 404 and that reproduces the output signal of the Gray mapper 210 in the transmitter.

The de-mapper and second FEC decoder 404 may receive the output of the detector 402 and uses the second FEC code to reverse the mapping of data to the modulation format that occurred at the transmitter. As shown, de-mapping is performed iteratively in response to a priori log likelihood ratio (LLR) feedback from the output of the receiver, i.e. the output of the multiplexer 410 in the illustrated embodiment. The de-mapper and second FEC decoder 404 provides the de-mapped data on a data path 205 to reproduce the output of the interleaver 206 in the transmitter. The output of the de-mapper and second FEC decoder 404 is coupled to the de-interleaver 406 which reverses the bit-interleaving performed by the associated interleaver 206 in the transmitter and provides k associated outputs to the first FEC code decoders 408-1, 408-2 . . . 408-k. The de-mapper and second FEC decoder 404 also establishes and forwards extrinsic LLR information to the first FEC decoders 408-1, 408-2 . . . 408-k for use by the first FEC decoders 408-1, 408-2 . . . 408-k as a priori LLR information in decoding the inputs thereto.

The first FEC code decoders 408-1, 408-2 . . . 408-k may each be configured to decode the data stream received thereby using the first FEC code and the extrinsic LLR information received from the de-mapper and second FEC decoder 404. The k decoded outputs of each of the first FEC code decoders 408-1, 408-2 . . . 408-k are coupled to a known multiplexer 410. The multiplexer 410 multiplexes the k de-mapped, de-interleaved and decoded bit streams 409-1, 409-2 . . . 409-k to produce the serial digital output 118-N of the receiver.

The output 118-N is fed back to the de-mapper and second FEC decoder 404 through the interleaver 411 to provide a priori LLR information used by the de-mapper and second FEC decoder in decoding the input thereto. The interleaver 411 essentially reverses the de-interleaving performed by the de-interleaver 406.

Those of ordinary skill in the art will recognize that a modified BICM-ID scheme consistent with the present disclosure may be provided in a variety of configurations. In one embodiment consistent with the present disclosure, the first FEC code may be a 7% overhead LDPC code, the second FEC code may be an SPC code and data modulation may be performed using a QAM format. In such an embodiment, if the number k of data streams is 7, the 7 coded and interleaved information bits and one single parity bit may be grouped at the output of the Second FEC code encoder 208 into an 8-bit vector C=(C(0), C(1), . . . , C(7)). The vector C is coded with Gray mapping by the Gray mapper 210 into two 16 QAM symbols s(1), s(2) that are modulated onto an optical carrier $\lambda_N$ by the modulator 212. There are $2^k$ possible pairs of 16 QAM symbols.

At the receiver, the de-mapper and second FEC decoder 404 processes the received pair of symbols $r_1$ and $r_2$ and the corresponding a priori bit LLRs, $$L_a(C(i)) = \log(P(C(i)=0)) - \log(P(C(i)=1)) \text{ for } i=0 \text{ to } k, \quad (1)$$

from receiver output to calculate the extrinsic LLR as:

$$L_e(C(i)) = \max\left(\log(P(r_1, r_2 \mid C_0)) + \sum_{j \neq i}(1 - C_0(j))L_a(C(j))\right) - \max\left(\log(P(r_1, r_2 \mid C_1)) - \sum_{j \neq i} C_1(j)L_a(C(j))\right) + L_a(C(i)), i = 1, 2, \ldots, 8 \quad (2)$$

where $C_0$ and $C_1$ denote the 8-bit vector whose bit value as 0 or 1 in position $i \in \{0, 1, \ldots, k-1\}$ respectively, and $C_{b \in \{0,1\}}(j) \in \{0,1\}$, for $j=0,1,\ldots, k$. For a given signal-to-noise ratio (SNR) per bit, the variance of the noise $\sigma^2$ may be calculated and the log likelihood of two symbols is calculated as:

$$\log(P(r_1, r_2 \mid C)) = \frac{-1}{2\sigma^2}[(r_1 - s(1))^2 + (r_2 - s(2))^2] \quad (3)$$

The extrinsic LLR information from the de-mapper and second FEC decoder 404 is then forwarded to the first FEC code decoders 408-1, 408-2 ... 408-k and used as a priori information needed for decoding purposes.

Figure 5:
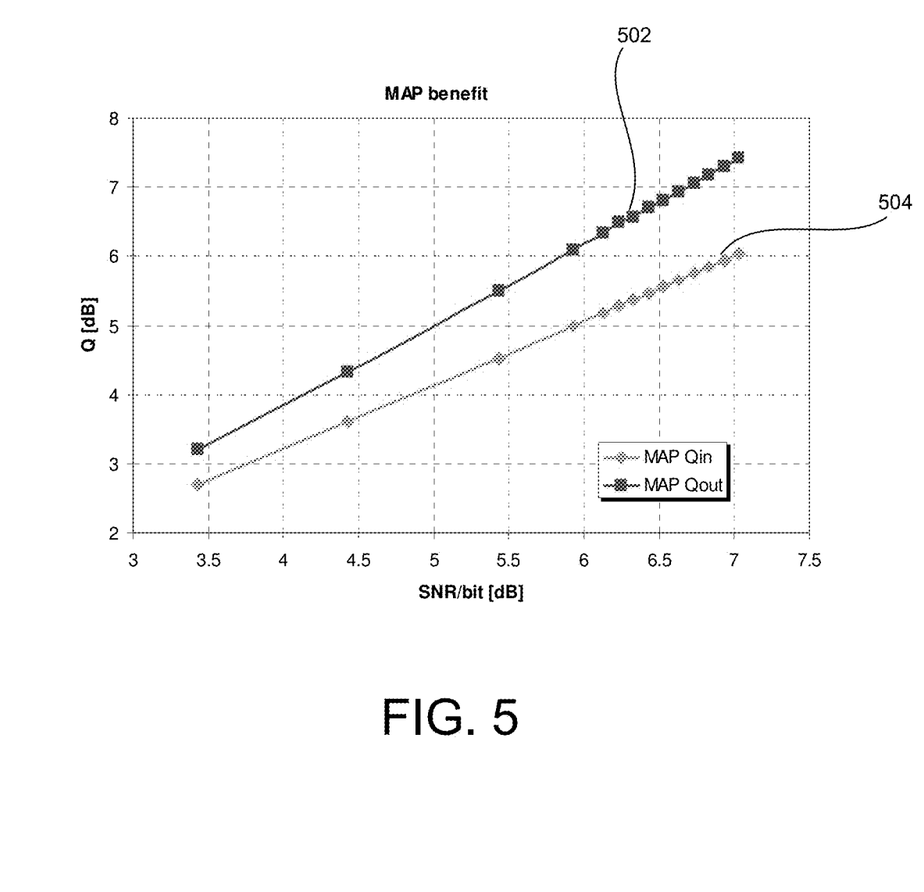
FIG. 5 is a plot of Q input and output vs. SNR per bit illustrating performance of a de-mapper including an MAP SISO decoder consistent with the present disclosure.

If a decision regarding the bit value of C(i) is made in 404 according to $L_e(C(i))$, then the de-mapper and second FEC decoder 404 may be referred to as including a two-symbol maximum a posteriori (MAP) detector. FIG. 5 includes plots 502, 504 showing the Q improvement by two-symbol MAP soft-input soft-output (SISO) decoder at different SNR levels when $L_a(C(i))=0$, $i \in \{0, 1, \ldots, k\}$ in the first iteration of decoding when a priori information of C(i) is not yet available. Plot 502 is a plot of SNR/bit vs. the Q value at the output of the de-mapper and second FEC decoder 404, and plot 504 is a plot of SNR/bit vs. the Q value at the input of the de-mapper and second FEC decoder 404. In the first iteration when a priori information of C(i) is not yet available from the output of the receiver equation (2) becomes:

$$L_e(C(i))=\max(\log(P(r_1,r_2 \mid C_0)))-\max(\log(P(r_1,r_2 \mid C_1))) \quad (4)$$

In this first iteration, the MAP detector of the de-mapper and second FEC decoder 404 selects a pair of symbols which have a minimum Euclidean distance from the received pair of symbol $(r_1, r_2)$ then demodulates into k information bits.

With reference again to FIG. 3, by adding a constraint that the total number of bits which equal to 1 within C is an odd number (as indicated by the parity bit of the SPC code), we can see that if s(1) lies in states labeled A in FIG. 3, then s(2) will only lie one of the states labeled B in FIG. 3. For example, if s(1)=1111, then s(2) can only be one of the possible values {0010, 1110, 0111, 1011, 0001, 1101, 0100 and 1000}, which has a minimum Euclidean distance of $\sqrt{2}d_{min}$. This is in contrast with the unconstrained case where s(2) can lie in any of the 16 possible states where the minimum Euclidean distance in $d_{min}$.

In this embodiment, the two-symbol MAP decoder of the de-mapper and second FEC decoder 404 cannot decode an even number of bit errors since the parity bit is unchanged. However, the first FEC code decoders 408-1, 408-2 ... 408-k, which are configured as LDPC decoders in this example, have much longer correlation length and the bit errors from the same 8-bit vector are permuted and distributed among the k LDPC decoders. Also, the a priori LLR feedback from the LDPC decoders to the MAP decoder in the de-mapper and second FEC decoder 404 after the first iteration will help to improve the MAP detector and thus improve the reliability of the extrinsic LLR sent from the MAP detector in the de-mapper and second FEC decoder 404 into the LDPC decoders.

Figure 6:
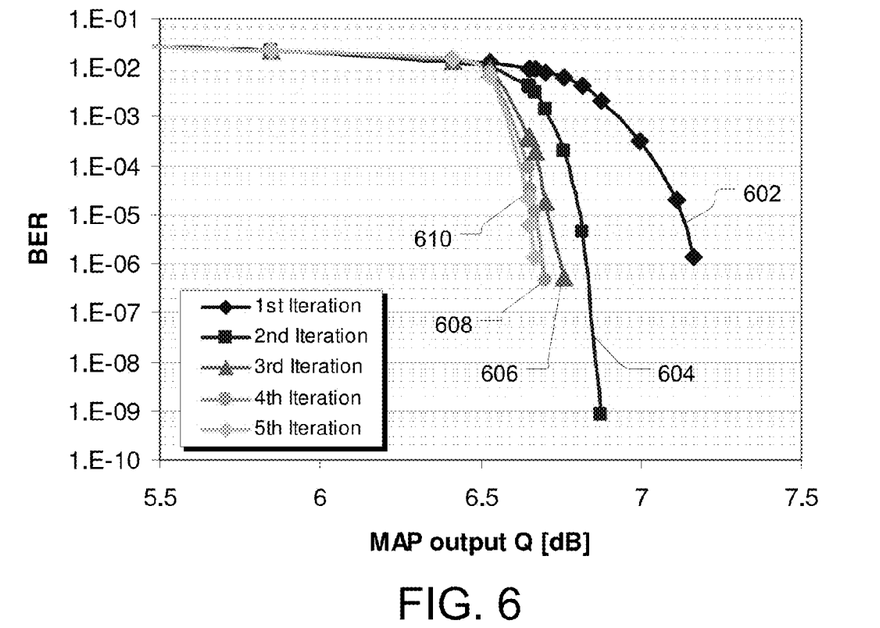
FIG. 6 is a plot of BER vs. MAP output Q illustrating performance of an exemplary modified BICM-ID scheme consistent with the present disclosure.

Performance of the above-described SPC-BICM-ID embodiment using a 7% LDPC code as the first FEC code is illustrated in connection with FIGS. 6 and 7. FIG. 6 includes measured plots 602, 604, 606, 608 and 610 of the bit error rate (BER) at the output of the receiver vs. Q (dB) at the output of the MAP decoder (which is coupled to the input of the LDPC decoders). Each plot 602, 604, 606, 608 and 610 is associated with a different iteration of the decoding at the receiver. The illustrated plots show an FEC threshold improvement with the iterative decoding and de-mapping in a modified BICM-ID scheme consistent with the present disclosure. At the first iteration illustrated in plot 602, the 7% overhead LDPC decoder has about 7.8 dB FEC threshold. The FEC threshold is reduced to 6.5 dB at the decoder input (MAP output) after the $5^{th}$ iteration illustrated in plot 610.

Figure 7:
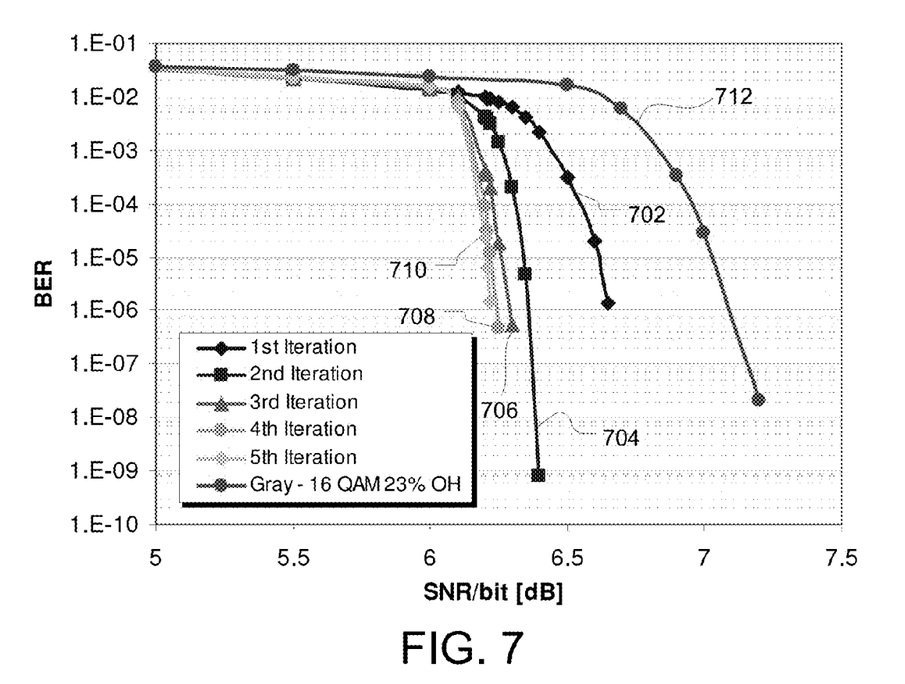
FIG. 7 is a plot of BER vs. SNR per bit illustrating performance of an exemplary modified BICM-ID scheme consistent with the present disclosure.

FIG. 7 includes measured plots 702, 704, 706, 708 and 710 of the bit error rate (BER) at the output of the receiver vs. SNR/bit (dB) at the input to the receiver. Each plot 702, 704, 706, 708 and 710 is associated with a different iteration of the decoding at the receiver. For comparison, plot 712 is associated with a conventional BICM scheme using an LDPC FEC code with 23% overhead and 16 QAM with Gray mapping. The illustrated plots show that a modified BICM-ID scheme consistent with the present disclosure produces an FEC threshold improvement compared to a conventional BICM scheme. As illustrated by plot 712, the FEC threshold for the conventional BICM scheme is above 7 dB. At the first iteration illustrated in plot 702, the SPC-BICM-ID scheme consistent with the present disclosure has a threshold below 7 dB and the FEC threshold is reduced to less than 6.5 dB about after the $5^{th}$ iteration illustrated in plot 710.

Figure 8:
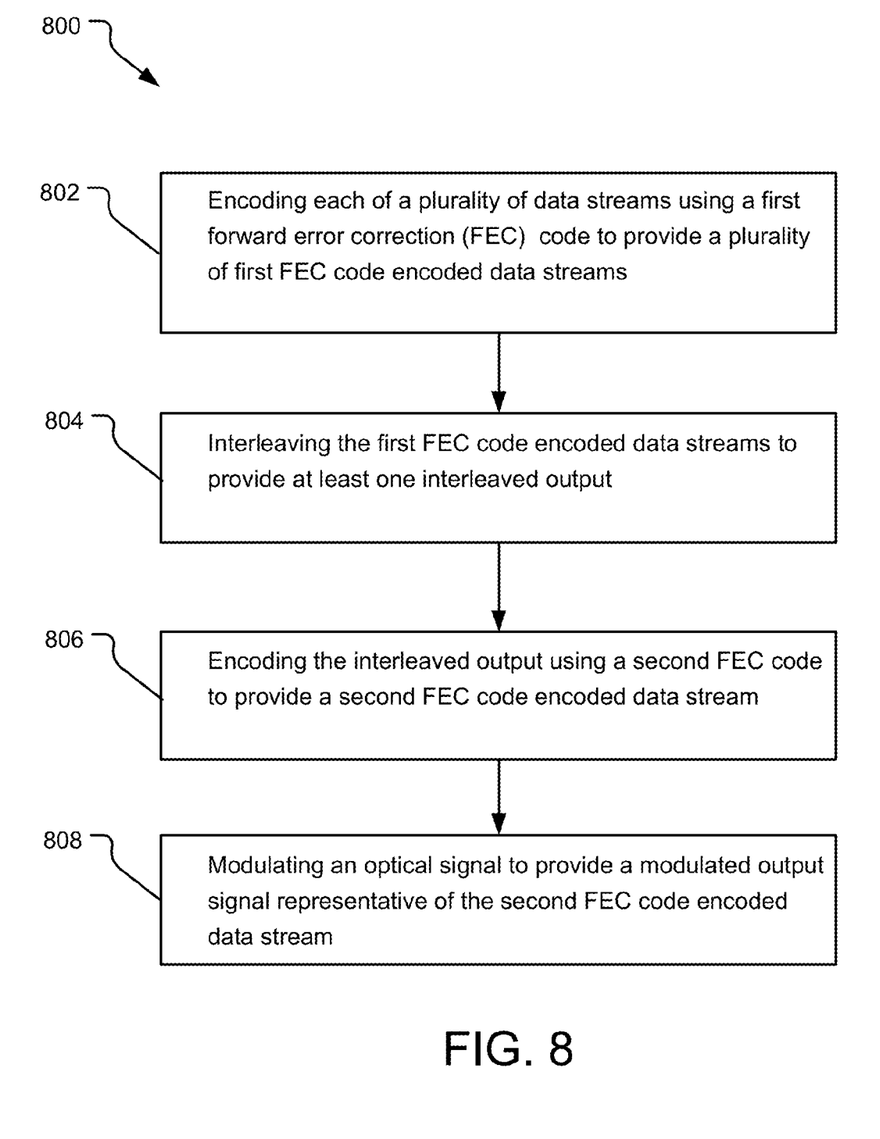
FIG. 8 is flow chart illustrating one example of a method consistent with the present disclosure.

FIG. 8 is a flow chart illustrating a method 800 consistent with the present disclosure. Operation 802 includes encoding each of a plurality of data streams using a first forward error correction (FEC) code to provide a plurality of first FEC code encoded data streams. The first FEC code encoded data streams are interleaved 804 to provide at least one interleaved output. The interleaved output is encoded 806 using a second FEC code to provide a second FEC code encoded data stream. An optical signal is modulated 808 to provide a modulated output signal representative of the second FEC code encoded data stream.

While FIG. 8 illustrates various operations according to an embodiment, it is to be understood that not all of the operations depicted in FIG. 8 are necessary for other embodiments. Indeed, it is fully contemplated herein that in other embodiments of the present disclosure, the operations depicted in FIG. 8, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

According to one aspect of the disclosure there is provided a system including: a plurality of first forward error correction (FEC) code encoders, each of the first FEC code encoders being configured to encode an associated input signal using a first FEC code and provide an associated first FEC code encoded output; an interleaver coupled to at least one of the plurality of first FEC code encoders and configured to provide an interleaved output including at least a portion of the associated first FEC code encoded output of the at least one of the plurality of first FEC code encoders; a second FEC code encoder coupled to the interleaver and configured to encode the interleaved output with a second FEC code and provide a second FEC code encoded output; and a modulator coupled to the second FEC code encoder and configured to modulate an optical signal in response to the second FEC code encoded output to provide a modulated output signal.

According to another aspect of the disclosure, there is provided an optical signal receiver including: a second forward error correction (FEC) decoder configured to receive an interleaved signal encoded with first and second FEC codes and decode the signal using the second FEC code to provide a second FEC code decoded output signal; a de-interleaver coupled to the second FEC decoder and configured to provide a plurality of de-interleaved outputs in response to the second FEC code decoded output signal; and a plurality of first FEC code decoders, each of the first FEC code decoders being configured to receive an associated one of the de-interleaved outputs and provide an associated first FEC code decoded output signal.

According to another aspect of the disclosure there is provided a method including: encoding each of a plurality of data streams using a first forward error correction (FEC) code to provide a plurality of first FEC code encoded data streams; interleaving the first FEC code encoded data streams to provide at least one interleaved output; encoding the interleaved output using a second FEC code to provide a second FEC code encoded data stream; and modulating an optical signal to provide a modulated output signal representative of the second FEC code encoded data stream.

Embodiments of the methods described herein may be implemented using a processor and/or other programmable device. To that end, the methods described herein may be implemented on a tangible, computer readable storage medium having instructions stored thereon that when executed by one or more processors perform the methods. Thus, for example, the transmitter and/or receiver may include a storage medium (not shown) to store instructions (in, for example, firmware or software) to perform the operations described herein. The storage medium may include any type of tangible medium, for example, any type of disk including floppy disks, optical disks, compact disk read-only memories (CD-ROMs), compact disk re-writables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

It will be appreciated by those skilled in the art that any block diagrams herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

As used in any embodiment herein, "circuitry" may comprise, for example, singly or in any combination, hardwired circuitry, programmable circuitry, state machine circuitry, and/or firmware that stores instructions executed by programmable circuitry. In at least one embodiment, the transmitter and receiver may comprise one or more integrated circuits. An "integrated circuit" may be a digital, analog or mixed-signal semiconductor device and/or microelectronic device, such as, for example, but not limited to, a semiconductor integrated circuit chip.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A system comprising:

a plurality of first forward error correction (FEC) code encoders, each of said first FEC code encoders being configured to encode an associated input signal using a first FEC code and provide an associated first FEC code encoded output;

an interleaver coupled to at least one of said plurality of first FEC code encoders and configured to provide an interleaved output comprising at least a portion of said associated first FEC code encoded output of said at least one of said plurality of first FEC code encoders;

a second FEC code encoder coupled to said interleaver and configured to encode said interleaved output with a second FEC code and provide a second FEC code encoded output;

a modulator coupled to said second FEC code encoder and configured to modulate an optical signal in response to said second FEC code encoded output to provide a modulated output signal;

a second FEC decoder configured to receive a signal representative of said modulated output signal and decode said signal using said second FEC code to provide a second FEC code decoded output signal;

an de-interleaver coupled to said second FEC decoder and configured to provide a plurality of de-interleaved outputs in response to said second FEC code decoded output signal;

a plurality of first FEC code decoders, each of said first FEC code decoders being configured to receive an associated one of said de-interleaved outputs and provide an associated first FEC code decoded output signal;

a multiplexer configured to receive each of said first FEC code decoded output signals and multiplex said first FEC code decoded output signals into a serial output data stream; and an interleaver configured to interleave said output data stream to provide feedback to the second FEC decoder.

2. A system according to claim 1, wherein said second FEC code comprises a single parity check (SPC) code.

3. A system according to claim 1, wherein said first FEC code comprises a low density parity check code (LDPC).

4. A system according to claim 1, wherein said modulated output signal has a quadrature amplitude modulation (QAM) format.

5. A system according to claim 1, wherein said first FEC code comprises a low density parity check (LDPC) code and said second FEC code comprises a single parity check (SPC) code.

6. A system according to claim 1, said system further comprising a Gray mapper coupled to said second FEC code encoder and configured to map said second FEC code encoded output using a Gray code.

7. A system according to claim 1, said system further comprising a demultiplexer configured to receive a serial input data stream and demultiplex said serial input data stream into a plurality of demultipexed data streams, each of said demultiplexed data streams being coupled to an associated one of said first FEC code encoders as said associated input signal.

8. A system according to claim 1, wherein said interleaver is coupled to each of said plurality of said first FEC code encoders, and wherein said interleaved output comprises at least a portion of each of said associated first FEC code encoded outputs.

9. An optical signal receiver comprising:
a second forward error correction (FEC) decoder configured to receive an interleaved signal encoded with first and second FEC codes and decode said signal using said second FEC code to provide a second FEC code decoded output signal;
a de-interleaver coupled to said second FEC decoder and configured to provide a plurality of de-interleaved outputs in response to said second FEC code decoded output signal;
a plurality of first FEC code decoders, each of said first FEC code decoders being configured to receive an associated one of said de-interleaved outputs and provide an associated first FEC code decoded output signal;
a multiplexer configured to receive each of said first FEC code decoded output signals and multiplex said first FEC code decoded output signals into a serial output data stream; and
an interleaver configured to interleave said output data stream to provide feedback to the second FEC decoder.

10. A receiver according to claim 9, wherein said second FEC code comprises a single parity check (SPC) code.

11. A receiver according to claim 9, wherein said first FEC code comprises a low density parity check code (LDPC).

12. A receiver according to claim 9, wherein said first FEC code comprises a low density parity check (LDPC) code and said second FEC code comprises a single parity check (SPC) code.

13. A method comprising:
encoding each of a plurality of data streams using a first forward error correction (FEC) code to provide a plurality of first FEC code encoded data streams;
interleaving said first FEC code encoded data streams to provide at least one interleaved output;
encoding said interleaved output using a second FEC code to provide a second FEC code encoded data stream;
modulating an optical signal to provide a modulated output signal representative of said second FEC code encoded data stream;
decoding a signal representative of said modulated output signal using said second FEC code to provide a second FEC code decoded output;
de-interleaving said second FEC code decoded output to provide a plurality of de-interleaved outputs;
decoding said de-interleaved outputs using said first FEC code to provide a plurality of first FEC code decoded outputs;
multiplexing said first FEC code decoded outputs to provide an output data signal;
providing feedback by providing at least a portion of the output data signal for use in said decoding said signal representative of said modulated output signal using said second FEC code; and
iterating said decoding using said second FEC code, said de-interleaving, said decoding using said first FEC code, said multiplexing, and said providing feedback.

14. A method according to claim 13, said method further comprising
receiving an input signal; and
demultiplexing said input signal to provide said plurality of data streams.

15. A method according to claim 13, said method further comprising applying a Gray map to said second FEC code encoded data stream.

16. A method according to claim 13, wherein said second FEC code comprises a single parity check (SPC) code.

17. A method according to claim 13, wherein said first FEC code comprises a low density parity check code (LDPC).

18. A method according to claim 13, wherein said providing feedback by providing at least said portion of said output data signal for use in the decoding said signal representative of said modulated output signal using said second FEC code comprises interleaving the output data signal.

* * * * *